(12) United States Patent
Wright

(10) Patent No.: US 6,475,580 B1
(45) Date of Patent: Nov. 5, 2002

(54) MANUFACTURE OF ELONGATE ARTICLES

(75) Inventor: Charles William Wright, Newcastle (GB)

(73) Assignee: Oakbray Investment Company Limited, Staffordshire (GB)

( * ) Notice: Subject to any disclaimer, the term of this patent is extended or adjusted under 35 U.S.C. 154(b) by 0 days.

(21) Appl. No.: 08/809,938

(22) PCT Filed: Oct. 6, 1994

(86) PCT No.: PCT/GB94/02182

§ 371 (c)(1),
(2), (4) Date: Apr. 3, 1997

(87) PCT Pub. No.: WO96/11103

PCT Pub. Date: Apr. 18, 1996

(51) Int. Cl.[7] .................................................. B23B 1/08
(52) U.S. Cl. .................. 428/36.3; 428/36.5; 428/36.91; 428/304.4; 428/317.9; 428/298.1; 428/300.7; 156/162; 156/172; 156/174; 264/328.1
(58) Field of Search ................................ 428/36.3, 36.5, 428/36.91, 304.4, 317.9, 298.1, 300.7; 156/162, 172, 174; 264/328.1

(56) References Cited

U.S. PATENT DOCUMENTS 5,088,735 A * 2/1992 Shigetoh ..................... 428/36.3
5,722,908 A * 3/1998 Feeney et al. ............... 473/567

FOREIGN PATENT DOCUMENTS

| EP | 0 155 088 | 9/1905 |
|----|-----------|--------|
| EP | 0 309 257 | 3/1989 |
| GB | 2 154 541 | 9/1985 |
| GB | 2 231 834 | 11/1990 |
| GB | 2 276 859 | 10/1994 |
| JP | 59 194 762 | 11/1904 |
| JP | 54-123 175 | 9/1979 |
| JP | 2 88088 | 1/1990 |
| JP | 3-61030 | 3/1991 |
| JP | 5-92055 | 9/1991 |
| WO | WO 90/13408 | 11/1990 |

OTHER PUBLICATIONS

Das Mehrkomponenten–Spritzgiessverfahren als Wettbewerb oder Ergánzung zum Kompaktspritzgiessen! published by Battenfeld, dated Oct. 1907.

Derwent's Abstract of JP 5–92055.

Derwent's Abstract of JP 59–194 762.

Derwent's Abstract of JP 54–123 175.

Derwent's Abstract of JP 3–61030.

* cited by examiner

*Primary Examiner*—Elizabeth M. Cole
(74) *Attorney, Agent, or Firm*—Smith, Gambrell & Russell, LLP

(57) ABSTRACT

A method of manufacturing an elongate article such as a golf club shaft. An elongate hollow polymer core is formed by gas injection molding. A plurality of layers of a curable material are wrapped around the core. The layers have a uniaxial reinforcement with the reinforcement in respective layers inclined relative to each other. The wrapped core is subsequently cured.

34 Claims, 1 Drawing Sheet

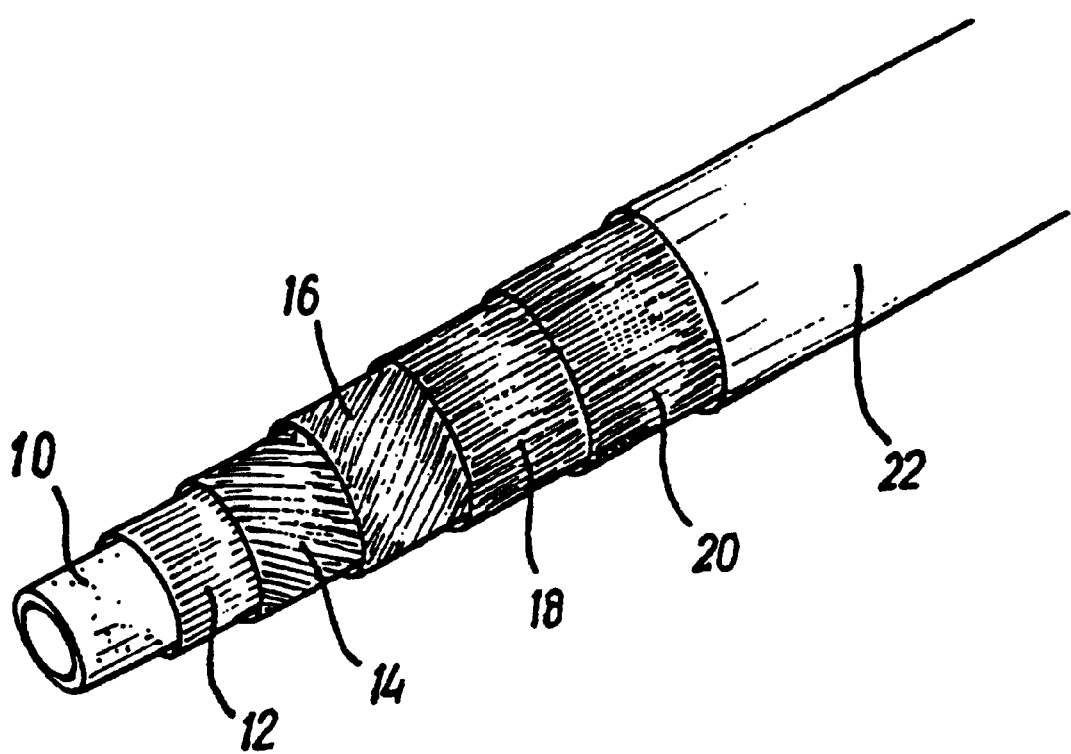

MANUFACTURE OF ELONGATE ARTICLES

This invention concerns a method of manufacturing elongate articles and articles made by this method, and particularly but not exclusively a method of manufacturing golf club shafts and shafts manufactured by this method.

With gold club shafts there are a number of important different characteristics. These include flex, torque, strength and weight. Originally wooden golf club shafts were used but subsequently steel shafts became the norm. More recently shafts have also been made from composite materials. Such composite shafts have conventionally been made by wrapping a plurality of layers of reinforced resinous material, usually between ten and fifteen layers, around a steel mandrel. The arrangement formed is subsequently cured and the mandrel removed after curing. Considerable force may be required to remove the mandrel. Forming shafts in this way involves a large number of production steps and can also result in somewhat expensive and relatively heavy shafts.

According to the present invention there is provided a method of manufacturing an elongate article, the method comprising forming an elongate hollow polymer core by injection moulding, wrapping a plurality of layers of a curable reinforced material around the core, and curing the subsequently formed wrapped core. Each successive layer of reinforced material is an elongate strip of material which is aligned parallel to the longitudinal direction of the article, and is of a size to substantially surround the core.

The core is preferably formed by gas injection moulding. The core is preferably formed in a closed mould, and measured amounts of gas and polymer are desirably introduced into the mould.

The polymer preferably includes reinforcing fibres which may be carbon fibre or boron. The polymer is preferably nylon based.

The curable material is preferably epoxy based and desirably has carbon fibre reinforcement.

The reinforcement of the curable material is preferably substantially uniaxial. One or more of the layers of curable material is preferably arranged such that the reinforcement therein lies substantially parallel to the longitudinal direction of the article. Another of the layers is preferably arranged such that the reinforcement is inclined relative to the longitudinal direction of the article. Said inclination is preferably between 25 and 45° and may be substantially 30°. A still further layer is preferably inclined at a similar angle but in an opposite direction.

The layers of curable material preferably comprise strips of material aligned parallel to the longitudinal direction of the article. The strips of material are preferably of a size to substantially completely surround the core with no overlap.

Preferably after the curable material is wrapped around the core and before curing, shrink wrap tape is applied around the curable material to cause consolidation during curing.

After curing the article is preferably ground which may remove the shrink wrap tape.

The temperature of curing of the wrapped core is preferably such that during curing the core becomes tacky and fuses with the wrapped material.

Also according to the present invention there is provided an elongate article manufactured by a method according to any of the proceeding ten paragraphs.

The invention further provides a golf club shaft manufactured by a method according to any of said preceding nine paragraphs.

Extra layers of curable material may be provided at particular places along the length of the shaft. For instance, an extra layer or layers may be provided at the head end of the shaft.

The shaft preferably tapers outwardly away from the head end. The shaft may have parallel sides in the region adjacent the head end.

Alternatively, the invention may provide an elongate article in the form of an aerial or fishing rod according to any of said ten proceeding paragraphs.

The article may comprise a plurality of connectable sections, with connecting means on the ends of the respective sections. The connection means may be formed on the core during moulding.

An embodiment of the present invention will now be described by way of example only with reference to the accompanying drawing which shows a diagrammatic part cut-away perspective view of a golf club shaft according to the invention.

This shaft was made by the following method. A hollow core 10 was formed by gas injection moulding. The core 10 was formed in a closed mould by first introducing a small portion of polymer into the mould then simultaneously introducing further polymer and nitrogen gas and maintaining the gas under pressure until the polymer had solidified. The polymer comprises 30% reinforced impact modified carbon fibre nylon (nylon 66). The core has parallel sides for the first 225 mm from the head end and subsequently tapers outwardly. The parallel sided end ensures that the head end of the shaft is of a correct size to fit into a club head even if the shaft is shortened to suit a particular player. Following moulding the core 10 is subject to centreless grinding to remove flashing and any handling contamination.

A layer 12 of high modulus epoxy based carbon fibre prepreg (HM55 - Torayca) is wrapped on the core 10. The fibers in the prepreg of the layer 12 are unidirectional and are aligned parallel to the longitudinal direction of the core 10. The layer 12 is formed from an elongate strip of a size to fully surround the core 10 but not overlap. A further layer 14 of a similar prepreg is wrapped around the layer 12 but with the fibres inclined at 30° relative to the axial direction of the core 10.

A further similar layer 16 is wrapped around the layer 14 with the fibres inclined at 30° to the axial direction but in an opposite direction. A layer 18 of a standard modulus prepreg (T300 Torayca) is wrapped around the layer 16 with the fibres aligned parallel to the axial direction of the core 10. The straight sided portion of the core 10 is strengthened with a boron filament prepreg (not shown) with the fibres therein aligned parallel to the axial direction of the core 10.

A further high modulus prepreg layer 20 is provided again with the fibres aligned parallel to the core 12. A still further layer 22 may be applied of a standard or lightweight modulus prepreg. Following wrapping of the prepreg layers 12–22, shrink wrapped tape (not shown) is wrapped around the wrapped core. The wrapped core is then cured at 120° for one hour fifty minutes. During this time the prepreg layers 12–22 cure and the tape shrinks consolidating the structure formed. The nylon core 10 also becomes tacky and bonds with the innermost layer 12. Following curing the shaft is subject to centreless grinding to remove the shrink wrapped tape and perhaps some of the outermost layer 22. The shaft is then ready for painting.

There is thus provided a golf club shaft with a number of advantageous features. The shaft described would be extra stiff with a 2° torque and thus suitable for use by a professional golfer. Despite having these characteristics the shaft only has 5/7 layers of prepreg and is consequently quite light. Using the method of manufacture according to the present invention involves considerably less labour than conventional methods. Furthermore the use of the injection moulded core considerably reduces the cost of materials used.

It is to be understood that the number and characteristics of the layers used can be varied as is required. Moreover, it may be possible to use other injection moulding techniques. Curing conditions are obviously chosen to suit the particular materials used but it is advantageous for bonding to occur between the innermost layer and the core.

It is also to be understood that this invention is not to be restricted to golf club shafts. This method of manufacture is also suited to manufacturing other elongate articles such as aerials or fishing rods. Such articles may be made on a number of sections and suitable connection means such as screw threads or a bayonet fitting may be provided in the core during moulding. Obviously many different materials may used other than those described.

Whilst endeavouring in the foregoing specification to draw attention to those features of the invention believed to be of particular importance it should be understood that the Applicant claims protection in respect of any patentable feature or combination of features hereinbefore referred to and/or shown in the drawing whether or not particular emphasis has been placed thereon.

What is claimed is:

1. A method of manufacturing an elongate article, the method comprising the steps of: forming an elongate hollow polymer core by injection moulding in a closed mould; wrapping a plurality of layers of a curable fibre reinforced material around the core, each successive layer being formed from an elongate strip of material aligned parallel to a direction of elongation of the article and being of a size to substantially surround the core; and curing the wrapped core at a temperature such that during said curing the core becomes tacky and fuses with the wrapped material, and wherein the strips of material are of a size to substantially completely surround the core with no overlap.

2. A method according to claim 1, wherein the core is formed by gas injection moulding.

3. A method according to claim 2, wherein measured amounts of gas and polymer are introduced into the mould.

4. A method according to claim 1, wherein the polymer includes reinforcing fibres.

5. A method according to claim 4, wherein the reinforcing fibres are carbon fibres.

6. A method according to claim 4, wherein the reinforcing fibres are boron.

7. A method of manufacturing an elongate article, the method comprising the steps of: forming an elongate hollow polymer core by injection moulding in a closed mould; wrapping a plurality of layers of a curable fibre reinforced material around the core, each successive layer being formed from an elongate strip of material aligned parallel to a direction of elongation of the article and being of a size to substantially surround the core; and curing the wrapped core at a temperature such that during said curing the core becomes tacky and fuses with the wrapped material, and wherein the polymer is nylon based.

8. A method according to claim 1, wherein the curable material is epoxy based.

9. A method according to claim 1, wherein the curable material has carbon fiber reinforcement.

10. A method according to claim 7, wherein the reinforcement of the curable material is substantially uniaxial.

11. A method according to claim 10, wherein one or more of the layers of curable material is arranged such that the reinforcement therein lies substantially parallel to the direction of elongation of the article.

12. A method according to claim 10, wherein one or more of the layers is arranged such that the reinforcement is inclined relative to the direction of elongation of the article.

13. A method according to claim 12, wherein said inclination is between 25° and 45°.

14. A method according to claim 13, wherein said inclination is substantially 30°.

15. A method according to claim 12, wherein a further layer is inclined at a similar angle but in an opposite direction.

16. A method according to claim 1, further comprising applying shrink wrap tape around the curable material after the curable material is wrapped around the core and before curing, wherein the shrink wrap tape causes consolidation during curing.

17. A method according to claim 16, further comprising grinding the article after curing to remove the shrink wrap tape.

18. An elongate article, wherein the article is manufactured by a method according to claim 1.

19. A golf club shaft, wherein the shaft is manufactured by a method according to claim 1.

20. A shaft according to claim 19, wherein extra layers of curable material are provided at particular places along the length of the shaft.

21. A shaft according to claim 20, wherein the shaft has a head end on which a golf club head is to be attached, and an extra layer or layers is provided at the head end of the shaft.

22. A shaft according to claim 19, wherein the shaft has a head end on which a golf club head is to be attached, and the shaft tapers outwardly away from the head end.

23. A shaft according to claim 19, wherein the shaft has a head end on which a golf club head is to be attached, and the shaft has parallel sides adjacent the head end.

24. An elongate article in the form of an aerial or fishing rod, wherein the article is manufactured by a method according to claim 1.

25. An article according to claim 24, wherein the article comprises a plurality of connectable sections, which each have ends, said article having connecting means on the ends of the respective sections.

26. An article according to claim 25, wherein the connecting means are formed on the core during moulding.

27. A method of manufacturing a shaft for a golf club, comprising: forming an elongate hollow polymer core for the golf club shaft by injection moulding in a closed mould; wrapping a plurality of layers of a curable fibre reinforced material around the core, each successive layer being formed from an elongate strip of material aligned parallel to a direction of elongation of the shaft and being of a size to substantially surround the core; and curing the wrapped core at a temperature such that during said curing the core becomes tacky and fuses with the wrapped material, and wherein the strip of curable reinforced material in contact with the core is of a size to substantially completely surround the core with no overlap.

28. A method of manufacturing a shaft for a fishing rod, comprising: forming an elongate hollow polymer core for the fishing rod shaft by injection moulding in a closed mould; wrapping a plurality of layers of a curable fibre reinforced material around the core, each successive layer being formed from an elongate strip of material aligned parallel to a direction of elongation of the shaft and being of a size to substantially surround the core; and curing the wrapped core at a temperature such that during said curing the core becomes tacky and fuses with the wrapped material, and wherein the strip of curable reinforced material in contact with the core is of a size to substantially completely surround the core with no overlap.

29. A method of manufacturing a shaft for an aerial, comprising: forming an elongate hollow polymer core for the aerial shaft by injection moulding in a closed mould; wrapping a plurality of layers of a curable fibre reinforced material around the core, each successive layer being formed from an elongate strip of material aligned parallel to a direction of elongation of the shaft and being of a size to substantially surround the core; and curing the wrapped core at a temperature such that during said curing the core becomes tacky and fuses with the wrapped material, and wherein the strip of curable reinforced material in contact with the core is of a size to substantially completely surround the core with no overlap.

30. A method according to claim 27 wherein each of said strips of material is of a size to substantially surround the core with no overlap.

31. A method according to claim 28 wherein each of staid strips of material is of a size to substantially surround the core with no overlap.

32. A method according to claim 29 wherein each of said strips of material is of a size to substantially surround the core with no overlap.

33. A method according to claim 1, and wherein the polymer includes reinforcing fibers, and wherein each elongate strip includes fiber reinforcement with contacting layers having different fiber reinforcement inclination.

34. A method according to claim 7 wherein the strip of curable reinforced material in contact with the core is of a size to substantially completely surround the core with no overlap, and wherein each elongate strip includes fiber reinforcement with contacting layers having different fiber reinforcement inclination.

* * * * *